United States Patent Office 2,780,617
Patented Feb. 5, 1957

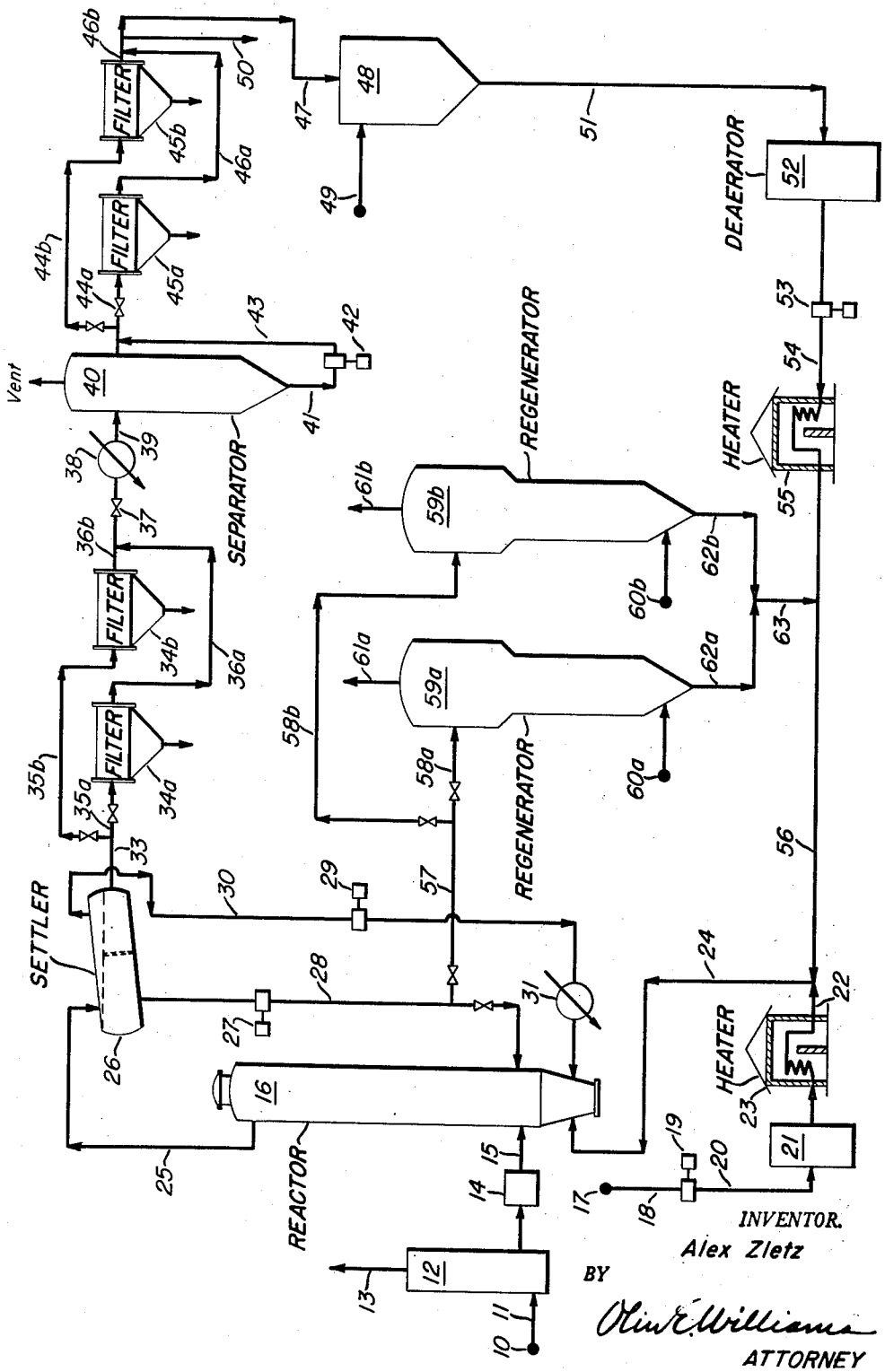

2,780,617
ETHYLENE POLYMERIZATION WITH CONDITIONED MOLYBDENA CATALYST

Alex Zletz, Park Forest, Ill., assignor to Standard Oil Company, Chicago, Ill., a corporation of Indiana Application May 17, 1952, Serial No. 288,501

7 Claims. (Cl. 260—88.1)

This invention relates to a novel polymerization process and to novel polymerization products produced thereby. In a more specific aspect, this invention relates to a novel process for the polymerization of ethylene, propylene, or mixtures of ethylene with another olefin such as propylene. This application is a continuation-in-part of my copending application Serial No. 223,641 filed April 28, 1951, now U. S. Patent No. 2,692,257. My copending application describes a novel catalyst for the preparation of higher molecular weight hydrocarbons from ethylene-containing gas mixtures in the presence of a reduced molybdena-gamma alumina catalyst.

A primary object of my invention is the provision of a continuous process for the polymerization of ethylene, propylene, or ethylene-containing gases to high molecular weight normally solid polymers. Another object is the provision of a process for the polymerization of ethylene in a carrier medium, which beneficially affects the course of the polymerization and the high molecular weight polymers obtained thereby, and under conditions which notably facilitate the recovery of the said high molecular weight polymers. Another object of my invention is the provision of a novel process for the conversion of gas mixtures comprising essentially ethylene to high molecular weight solid resinous or plastic materials. Still another object is to provide new ethylene homopolymers having extremely high molecular weights and related physical mechanical properties heretofore unattained in the art.

A further object is to provide a relatively low temperature, low pressure process for the conversion of ethylene-containing gases to high molecular weight resinous or plastic materials. An additional object of the present invention is to provide a process for the copolymerization of ethylene with other polymerizable materials, particularly with a normally gaseous mono-olefin as propylene.

Yet another object of this invention is the provision of novel methods for the regeneration of solid catalysts employed for the conversion of ethylene-containing gas streams to high molecular weight solid materials. These and other objects of my invention will become apparent from the ensuing description.

Briefly stated, the process of the present invention comprises the conversion of ethylene, propylene, or mixtures thereof to high molecular weight, normally solid polymers by contact at elevated temperature with a catalyst comprising essentially a reduced molybdenum oxide combined with alumina, titania or zirconia. The alumina, titania or zirconia are in an activated absorptive form, the alumina, for example, being of the type termed gamma-alumina. The process of the invention is effected at temperatures between about 75° and about 325° C., preferably between about 130° and 260° C., and under pressures between about atmospheric and 5,000 p. s. i. g. or higher, preferably between about 200 and 2,000 or about 1,000 p. s. i. g. The normally solid materials produced by the catalytic conversion tend to accumulate upon and within the solid catalyst. The tendency of polymer to accumulate on catalyst can be restricted or eliminated and the rate of ethylene conversion can be favorably influenced by maintaining the catalyst, during ethylene conversion, in contact with a liquid medium which serves both as a reaction medium and as a solvent or carrier medium for the solid reaction products. I have found that dispersions of high molecular weight polymer in concentrations less than 10 and preferably less than about 5 percent by weight based on the total reaction mixture can be readily removed from a reaction zone and be processed for separation of product. Liquid reaction media which affect the above benefits and also notable improvement in yield and product quality include various hydrocarbons such as tetralin or decalin, and particularly an aromatic hydrocarbon such as benzene, toluene or xylenes. This invention further comprehends a process of polymerizing ethylene or propylene or ethylene-propylene mixtures comprising, in combination, the steps of reducing the molybdena catalyst to a subhexavalent form in a stream of hydrogen maintained at a temperature of at least about 400° C., concomitantly removing water from the catalyst, forming a slurry of hydrocarbon reaction medium with the catalyst in reduced form, mixing olefin with reaction medium and bringing the olefin into contact with the catalyst, and effecting polymerization of the ethylene until a concentration between about 0.2 and 10.0 percent, and preferably between 0.5 and 5 percent, by weight based on the solvent, of polyethylene is formed. The process further comprises the steps of removing the reaction slurry and polyolefin product from the reaction zone, separating catalyst from the slurry and preferably recycling catalyst to the reaction zone, separating residual catalyst from reaction product at elevated temperature and pressure, cooling the filtrate and reducing the pressure, thereafter recovering precipitated polyolefin from the cooled filtrate, recycling unreacted olefin to the reaction zone, and intermittently or continuously regenerating and reactivating all or a portion of the employed solid catalyst. It is preferable to purify the olefin-containing gas stream and the hydrocarbon reaction medium particularly with respect to removing oxygen, sulfur-containing compounds, and moisture.

In the accompanying drawing which is provided to illustrate a preferred embodiment of the above described combination of process steps, the single figure is a schematic flow diagram for a continuous ethylene polymerization process employing the solid catalyst of this invention.

With specific reference to the drawing, hydrogen is flowed from a source 10 into a catalyst activation zone 11 and excess hydrogen escapes through recycle or vent line 12. Within the said zone 11 hydrogen is brought into contact with solid catalyst at a temperature of about 440° to 470° C. and under a pressure of hydrogen of about 1,000 pounds per square inch gauge. Reduced and activated molybdena catalyst is removed from the zone 11 and is slurried with an appropriate solvent in mixer 13. The slurry is pumped from mixer 13 by pump 14 through line 15 into reactor 16.

Gas containing ethylene or propylene is passed from a source 17 through line 18 to booster pump 19 which raises the pressure of the said gas to approximately 1,000 pounds per square inch gauge. The compressed gas is passed through line 20 into a deoxygenator 21 which can consist of beds of reduced copper oxide and/or silica or alumina gel in series. The ethylene-containing gas in which the oxygen content has been reduced to at most about 10 parts per million is flowed from the deoxygenator 21 through line 22 in which is disposed heater 23. The ethylene-containing gas flows in admixture with recycle solvent-catalyst slurry through line 24 into the said reactor 16. The said gas mixture passes into the said slurry in the reactor 16 at a rate such that a liquid hourly space velocity of between about 1 and 2 volumes of ethylene solution in a liquid reaction medium per volume of catalyst per hour will be maintained. The temperature of polymerization is maintained at about 230° C. and the total pressure of ethylene and solvent at about 1,000 p. s. i. g. The average residence time of reactants in the reactor 16 is between about 5 and 30 minutes. At the conclusion of the reaction period for any particular aliquot passing through the reactor, the reaction medium should contain, in solution from 0.2 to about 5 percent, by weight, of polyethylene.

Catalyst slurry, polyethylene and unreacted dense phase ethylene pass in admixture from the reactor 16 through line 25 into a catalyst settler 26 maintained at substantially reaction temperature. The catalyst slurry settles in the catalyst settler 26 and is withdrawn as a relatively thick slurry by pump 27 through line 28 and is returned through said line into the reactor 16.

Ethylene in the reaction zone can be present in excess of the solubility of ethylene in reaction medium under reaction conditions. This excess ethylene, liberated from the reactor 16 and separated in catalyst settler 26, can be recycled by pump 29 through line 30 into a heat exchanger 31 which customarily operates to cool the recycled ethylene and thereby maintain temperature control in the reactor, the polymerization reaction being exothermic. Alternate methods, for example cooling the feed before charging to the reactor, can be employed to maintain the temperature control.

Liquid reaction medium containing only a minor quantity of solid catalyst is decanted as an upper layer from the catalyst settler 26 and is flowed through line 33 into catalyst filters 34a and 34b which are positioned in parallel and are operated significantly at substantially reaction temperature. These elevated temperatures are employed to ensure the fluidity of the reaction product. The product-containing liquid reaction medium flows from the said line 33 through parallel lines 35a and 35b and into the said filters disposed in said lines.

The filtrate is passed through line 36a or 36b and pressure reduction valve 37 into a cooler 38 and thence through line 39 into ethylene separator 40 which is usually operated at atmospheric temperature and pressure. Ethylene dissolved in the effluent liquid reaction medium is separated in the said separator 40 and is recycled. It is especially advantageous to recycle this ethylene as it has become highly purified by the preceding polymerization step.

The product slurry, being substantially free of solid catalyst and containing polyethylene precipitated in the separator at the said low temperature thereof, is removed from the separator 40 through line 41 and is pumped by centrifugal pump 42 through line 43 and parallel lines 44a and 44b to either one or both of product filters 45a and 45b. The polyethylene is separated as a filter cake in the said filters and is removed for drying, milling, or other subsequent treatment not shown. Liquid reaction medium is removed as filtrate from the filters 45a and 45b and flows through parallel lines 46a and 46b and thence through line 47 to collector drum 48, into which fresh reaction medium is introduced from a line 49. The content of low-molecular-weight by-product, that is soluble in the reaction medium at filtering temperature, can be kept to a minimum by continuously withdrawing a portion of the medium through line 50, and separating the medium and the said by-product. After said separation by, for example, distillation means (not shown), the refined solvent is delivered to collector drum 48. Liquid reaction medium is withdrawn from the collector 48 through line 51 into a deaerator 52 and is then pumped by a pump 53 through line 54 and heater 55 into line 56. The heated liquid reaction medium flows from line 56 into line 24 and admixes therein with dense phase heated ethylene and, in such admixture, flows into reactor 16.

A portion of the settled catalyst slurry that is recycled through line 28 to the reactor 16 is withdrawn from said recycle and passed through line 57 into parallel lines 58a and 58b and thence into a set of catalyst regenerators 59a and 59b disposed in parallel. The settled catalyst slurry is flowed from line 57 through valved line 58a into the regenerator 59a until an optimum volume of catalyst slurry is delivered into the regenerator. Catalyst slurry is then directed from the line 57 through valved line 58b into the regenerator 59b. The catalyst in the regenerators can be washed in a solvent, preferably the same liquid as is employed as reaction medium, both to recover very high molecular weight polymer deposited thereon and to free the surface of the catalyst. If the catalyst becomes coated with carbon or refractive polymer it can be oxidized with an oxygen-containing gas and subsequently be reduced in the following manner. Hydrogen is flowed through a line 60a into the regenerator 59a under a pressure between about atmospheric and 1000 p. s. i. g. and effects a reduction at a temperature between about 250° and 500° C. of spent or partially spent catalyst in the regenerator, restoring the molybdena to an active, subhexavalent condition. Excess hydrogen is released through vent 61a and can be recycled to the regenerator system. In like manner, hydrogen is flowed through line 60b into the regenerator 59b and catalyst is reduced to form a subhexavalent molybdena. The hydrogen is released through a vent 61b.

The regenerated catalyst is removed from regenerators 59a and 59b and flowed through respectively lines 62a and 62b and line 63 into the heated reaction medium flowing through line 56. The catalyst is slurried with the heated reaction medium in the said line 56 and is introduced into admixture with dense phase ethylene in line 24 to form a solution introduced into the reactor 16.

It is understood that many variations can be made in the above process with respect to heat interchange, product treatment, catalyst regeneration and the like, and that other variants described elsewhere can be introduced in the process; for example, propylene can be in part or in whole substituted for the ethylene.

The practice of the process of the present invention leads to ethylene homopolymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000, and tough resinous ethylene homopolymers having an approximate specific viscosity ($\times 10^5$) of 10,000 to more than 300,000. By the operation of the present inventive process it has been possible for the first time, so far as is known, to produce tough ethylene polymers having specific viscosities ($\times 10^5$) of well over 100,000, and even over 300,000. In addition, the process of the present invention can be employed to effect the copolymerization of ethylene with other polymerizable materials and particularly with propylene. Propylene alone has been polymerized, by the employment of the catalysts of the present invention, in low yield to extremely high molecular weight, rubber-like polymers, in addition to oils and grease-like solids. Other polymerizable materials such as n-butylenes, isobutylenes, acetylene, isoprene, etc., may be copolymerized with ethylene to a certain extent but the resultant polymers thus far produced closely resemble polymers obtained with ethylene alone.

An important feature of my process is the employment of a solid catalyst comprising essentially a gamma-alumina, titania, or zerconia base and a molybdenum-oxygen compound in a sub-hexavalent state, the preferred example of the latter being reduced molybdenum oxide ($MoO_3$). The relative proportions of base to supported molybdena is not critical and may be varied throughout a relatively wide range provided that each component is present in amounts of at least approximately 1%. Molybdena alone, whether in reduced or unreduced state, is ineffective and likewise the gamma-alumina or other support by itself is ineffective. The preferred molybdena-alumina weight ratios are in the range of about 1:20 to 1:1, or approximately 1:4. A large number of other common catalyst supports have been tested with various amounts of molybdena and found to be ineffective. Likewise, other catalyst components recognized as equivalents for molybdenum oxide in hydroforming have been found ineffective in my process even when supported on gamma-alumina. I prefer to employ a conditioned alumina-molybdena catalyst composed of gamma-alumina base containing about 1 to 80%, preferably about 5 to 35%, or approximately 20%, of molybdena (or other compound of molybdenum and oxygen) supported thereon.

The gamma-alumina base of the catalyst may be prepared in any known manner and the molybdenum may likewise be incorporated in or deposited on the base in any known manner. Excellent results have been obtained with alumina-molybdenum catalysts of the type conventionally employed for effecting commercial hydroforming, the word "hydroforming" being employed to mean processes of the type described in U. S. Letters Patents 2,320,147; 2,388,536; 2,357,332; etc. As hereinbefore mentioned, the support can consist of alumina, titania or zirconia. As set forth in considerable detail in my copending application Serial No. 223,641, the alumina base must be in gamma form and can be an activated alumina prepared from hydrated alumina, a gel type alumina base prepared by precipitating a gel from an aluminum salt solution, or a colloidal gel of the type prepared from aluminum metal. These bases are all effective as supports for the molybdena catalyst.

The porous catalyst bases, whether of alumina, zirconia or titania, should have surface areas in the range of 40 to 400 square meters per gram, as measured by nitrogen or n-butane adsorption (BET method). The molybdena or other molybdenum-oxygen compound, such as cobalt molybdate, may be incorporated in the catalyst base in any known manner, particularly as described in my copending application. Cobalt molybdate catalysts may be prepared as described in U. S. 2,393,288; 2,486,361, etc. The catalyst can comprise appreciable amounts of zirconia or titania, especially when one or more of these oxides is employed as the support (U. S. 2,437,531–2). Oxides of other metals such as magnesium, nickel, zinc, chromium, vanadium, thorium, etc., may be present in minor amounts, below 10 weight percent and preferably below 1 weight percent of the total catalyst. The catalyst, however, should be substantially free from oxides of alkali metals and iron, the latter being tolerable up to about 1%, but the former being maintained at as low a figure as possible.

I have found that the so-called "spent" molybdena-alumina catalysts from naphtha hydroforming operations are highly active catalysts for the polymerization of ethylene. The spent molybdena-alumina catalysts actually contain a substantial proportion of sulfur derived by the reaction of the molybdenum component of the catalyst with sulfur compounds contained in the naphtha being hydroformed or with $H_2S$ produced by hydrogenation of sulfur compounds during hydroforming; the evidence indicates that a substantial proportion of the molybdenum in the spent catalyst is present as a sub-hexavalent molybdenum sulfide, probably mostly $MoS_2$. By "spent" hydroforming catalyst it is intended to denote a catalyst containing coke-like hydrocarbon materials and one which can be regenerated by the conventional methods to its active state for hydroforming. When a molybdena-alumina catalyst which has been employed for naphtha hydroforming has been regenerated many times it at last reaches a "dead" state from which it cannot be regenerated; this "dead" state is associated with the conversion of gamma-alumina in the catalyst to the low surface area alpha-alumina, as determined by X-ray diffraction analysis.

The alumina-molybdena catalyst must be conditioned or activated before it is useful for effecting ethylene polymerization and the conditioning step is of great importance. It appears that at least a part of the molybdenum must be present in the final catalyst in a subhexavalent condition. Since molybdenum is usually composited with the absorptive alumina in the form of a hexavalent molybdenum compound, such as $MoO_3$ which can be produced by decomposition of ammonium paramolybdate, it is necessary to subject a catalyst to the conditioning or reducing step before it is effective for catalyzing ethylene polymerization. The conditioning or reducing step is preferably effected with hydrogen although other reducing gases such as carbon monoxide, mixtures of hydrogen and carbon monoxide (water gas, synthesis gas, etc.), sulfur dioxide, hydrogen sulfide, etc., may be employed. The temperature of the conditioning step should be higher than about 400° C., the best conditioning temperature usually being in the range of about 400° to about 500° C., and in any case usually not higher than about 650° C. The hydrogen partial pressure in the conditioning step may range from ordinary pressure to 3000 p. s. i. g. or more, but for practical purposes is usually in the range of about 50 to 500, e. g. about 200 p. s. i. g. The time required for the conditioning step is dependent upon the particle size of the catalyst and its molybdena content. With a particle size of about 4 to 6 mesh, a molybdenum oxide content of about 7.5% at about 200 pounds pressure, and at a temperature of about 460° C., most effective conditioning with hydrogen is obtained at a time of about 15 minutes; in this case some conditioning was effected at a time interval as low as 1 second or as long as 6 hours or more. With increasing amounts of moybdena on the catalyst, longer conditioning treatments are necessary and with decreased particle size, shorter times of conditioning are required even to the extent that a maximum effective conditioning period will exist for a powdered, or finely divided, catalyst. Thus, good activation of powdered catalyst containing 34% molybdena was obtained in 15 seconds, while this short time effected only fair conditioning of powdered catalyst containing 28% molybdena and was ineffective (apparently too long) for conditioning a catalyst containing 7.5% molybdena. For large particle sizes of the order of 2 to 6 mesh containing 7.5 to 30% or more of molybdena, the optimum conditioning time lies in the range of about 15 seconds to 15 hours, although usually 6 hours is ample.

The conditioning treatment hereinabove described is required not only for fresh catalyst, but is also required for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by burning combustible deposits therefrom with oxygen followed by the conditioning step. It has been observed that the conditioning treatment necessary to effect reactivation of catalysts from which polymer product has been removed can be effected at somewhat lower temperatures than would be effective in the initial conditioning of fresh catalyst preparations.

The catalysts, comprising essentially a sub-hexavalent molybdenum compound supported upon an adsorptive alumina, titania, or zirconia, can be employed in forms and sizes heretofore conventional in hydroforming operations with these and similar catalysts, for example, as pellets of generally cylindrical, spherical, or other shapes, or even in the form of coarse lumps. Suitable catalyst pellets may range in size from about 2 to about 6 mesh per inch and are often of generally cylindrical shape, having dimensions, for example, of ⅜ inch long and ⅜ inch diameter. Powdered catalysts are highly active but rapidly become coated with polymer; thus, when powdered catalysts are used, high solvent-to-catalyst ratios such as 5–50 pounds of solvent per pound of catalyst should be employed in the reactor to yield lower viscosity and more soluble polymer and thus to effect efficient removal of the polymer.

The charging stock to the present polymerization process comprises essentially ethylene or propylene or mixtures thereof. The ethylene charging stocks may contain inert hydrocarbons, as in refinery gas streams, for example, methane, ethane, or propane. When the charging stock contains an ethylene and propylene mixture, both of these olefins contribute to the production of resinous high molecular weight products.

Oxygen in the said stock effects temporary poisoning of the catalyst but the catalyst can be reactivated by reduction. Water in the form of steam effects an irreversible poisoning of molybdena-alumina catalysts, so that they cannot thereafter be reactivated by purging or reducing treatments alone.

In general, polymerization can be effected in the present process at temperatures between about 75° C. and about 325° C. Increasing the polymerization temperature tends to reduce the average molecular weight of the polymer produced by the process. It is often desirable to select a polymerization temperature which is at least equal to the melting or softening point of the solid polymerization product. Usually polymerization is effected in the present process at temperatures between about 110° C. and about 275° C. or the preferred narrower range of 130°–260° C. As will be noted from the specific examples hereinafter supplied, the conjoint use of polymerization temperatures between about 200° C. and about 250° C. and a liquid aromatic hydrocarbon reaction medium is highly desirable in producing ethylene polymers having specific viscosities ($\times 10^5$) ranging on the average from about 10,000 to about 30,000 in continuous operations with relatively long on-stream periods and clean catalysts.

It has been found that the present process can be employed for the production of relatively high molecular weight ethylene hetero- and homo-polymers at relatively low pressures. For example, at a polymerization pressure of only about 1100 p. s. i. g., ethylene has been converted in substantial measure, according to the present process, to a homopolymer having a specific viscosity ($\times 10^5$) of about 200,000. These results are astounding when it is borne in mind that in prior art processes for the thermal polymerization of ethylene (as described in U. S. Patent 2,153,553) or polymerization of ethylene in the presence of oxygen as the catalyst (U. S. Patent 2,188,465), pressures in excess of 30,000 p. s. i. g. lead to the production of ethylene polymers having relatively low molecular weight, such as 24,000, as determined by the Staudinger specific viscosity method. The process of the present invention can be effected to some extent even at atmospheric pressure. The upper limit of polymerization pressure is dictated by economic considerations and equipment limitations and may be 10,000 p. s. i. g., 20,000 p. s. i. g., or even more. A generally useful and economically desirable polymerization pressure range is between about 200 and about 5000 p. s. i. g., preferably between about 500 and about 1500 p. s. i. g., e. g. about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, such as is described with reference to the drawing, suitable liquid hourly space velocities are usually selected between about 0.1 and about 10 volumes, preferably about .5 to 5 or about 1 to 2 volumes of ethylene solution in a liquid reaction medium per volume of catalyst. The amount of ethylene or other olefin in such solutions should be in the range of about 1 to 30 percent by weight, preferably about 2 to 10 weight percent or, for example, about 4 to 5 weight percent, thus corresponding to the desired content of polymer in effluent medium. In batch operations, operating periods of between about one-half and about 10 hours, usually between about 1 and about 4 hours, are employed and the reaction autoclave is charged with ethylene as the pressure falls as a result of the ethylene conversion reaction.

Ethylene can be polymerized in the gas phase and in the absence of a liquid reaction medium by contact with the molybdenum hydroforming-type catalysts employed in the present process. Upon completion of the desired polymerization reaction it is then possible to treat the catalyst for the recovery of the solid polymerization products, for example by extraction with suitable solvents. However, in the interests of obtaining increased rates of ethylene conversion and of continuously removing solid conversion products from the catalyst, it is desirable to effect the conversion of ethylene in the presence of suitable liquid reaction media. The liquid reaction medium may also be employed as a means of contacting the ethylene with catalyst by employing the technique of preparing a solution of ethylene in the liquid reaction medium and contacting the resultant solution with the polymerization catalyst. Usually it is preferred to employ inert liquid organic materials, particularly such hydrocarbons as benzene, toluene, xylenes, tetralin, and decalin, as reaction media in the present process.

The liquid reaction medium employed in the present process appears to perform a variety of functions, and to perform these functions in varying degrees depending upon the operating conditions, catalyst and identity of the medium. Thus, the liquid reaction medium appears to function as a solvent for the ethylene to bring the ethylene into the necessary contact with the catalyst surface or growing ethylene polymer chain. The liquid reaction medium may function to protect the growing polymer chain from chain breakers, such as reaction-inhibiting impurities in the feed stock, polymer already formed upon certain parts of the catalyst surface, etc. The liquid reaction medium serves to reduce the viscosity of the solid polymer retained upon and within the catalyst and thus may facilitate the process of transferring ethylene where it is needed. The medium dissolves some of the normally solid product from the catalyst surface. The liquid reaction medium makes possible a solid-liquid interface in which the growing ethylene polymer chain may be oriented and from which it may react with ethylene supplied from solution in the medium or from the gas phase. It should be understood, however, that I am in nowise bound by the theoretical considerations herein advanced to explain possible modes of action of the inert liquid reaction medium.

The fact remains that the inclusion of the liquid medium in the polymerization reaction zone in contact with the catalyst produces an unpredictable and often desirable change in the polymerization of ethylene conducive to the formation of high yields of normally solid hydrocarbon products. A particularly desirable effect of the liquid reaction medium is to increase substantially the rate of ethylene polymerization.

Various classes of individual hydrocarbons or their mixtures which are liquid and substantially inert under the polymerization reaction conditions of the present process can be employed. These reaction media, which are not necessarily equivalent, may include numerous aliphatic and aromatic hydrocarbons, a large number of which are listed in my copending application Serial No. 223,641. Among these particularly useful solvents are benzene, toluene, xylenes, ethylbenzene, pentane, hexane, dimethylbutane, octane, tetralin and decalin. Of the foregoing solvents, tetralin and decalin, and especially the latter, are particularly suitable in the polymerization of propylene or propylene-containing gas mixtures. These solvents resist alkylation and provide higher yields of propylene polymer.

The liquid hydrocarbon reaction medium may be present in the polymerization reaction zone in proportions of about 10 to about 99 percent by weight, based on the weight of both ethylene and reaction medium. The liquid hydrocarbon reaction medium is present in the reaction zone as a distinct liquid phase. At low ratios of ethylene to the hydrocarbon reaction medium, for example ratios between about 1 and about 30 percent, temperature control during the course of the ethylene conversion process can be readily accomplished owing to the presence in the reaction zone of a large liquid mass having relatively high heat capacity. The liquid hydrocarbon reaction medium can, moreover, be cooled by indirect heat exchange inside or outside the reaction zone. The employment of low ethylene concentrations in the hydrocarbon reaction medium also results in a marked reduction in the rate of accumulation of solid polymers on the catalyst in continuous operations.

The liquid hydrocarbon reaction medium will act as a solvent carrier for the polyolefin produced and will reduce or substantially eliminate the deposition of high molecular weight olefin on catalyst surfaces. A concentration of polymer between about 0.2 and 5 percent by weight of the reaction medium will provide a readily transportable liquid, higher concentrations within the range, e. g. 2 to 4 percent being preferred.

When these solutions or dispersions of polymer in hydrocarbon reaction medium are released to a reduced, and preferably atmospheric, pressure, and are cooled to a temperature between 0° and 40° C., and preferably about atmospheric temperature, the polymer will precipitate or separate from the reaction medium and can be filtered or otherwise removed from the liquid medium.

The regeneration of partially spent catalyst by treatment with hydrogen or other reducing agents can be effected under the same conditions employed for initial activation of a batch of fresh catalyst, but it has been found possible to use much milder conditions, i. e., lower temperatures and pressures.

A large series of batch polymerization tests were reported in my copending application and illustrated the effect of, (1) polymerization in gas or liquid phase, (2) certain reaction mediums, (3) hydrogen activation of the catalyst for various periods, (4) various molybdena alumina catalysts, (5) catalyst size, (6) spent hydroformer catalyst in use as a polymerization catalyst, (7) activation with carbon monoxide, sulfur dioxide, and the like, (8) poisoning with oxygen or water, (9) varying the molybdenum content of the catalyst, and (10) zirconia or thoria admixed with the molybdena on alumina catalyst. For purposes of brevity, the report of these runs is not repeated in this application.

In a test run with unsupported hydrogen-reduced $MoO_3$ under the standardized conditions employed in batch runs with benzene as the liquid reaction medium, no ethylene pressure drop was observable over a period of 4 hours and no ethylene polymers could be isolated. Molybdic acid powder failed to catalyze solid polyethylenes production at 230° C. and 1000 p. s. i. g. ethylene pressure. It was also found that the employment of a hydrogen-reduced 8% molybdena-activated coconut charcoal catalyst failed to induce ethylene polymerization under the standardized conditions employed in other batch runs. The employment of a commercial $MoS_2$-$ZnO$-$Mg$-$O$ hydrogenation catalyst at 127° C. and 1000 p. s. i. g. ethylene pressure yielded no solid ethylene polymer although a sulfur-containing hydroforming catalyst was active. A commercial $MoS_2$-gamma $Al_2O_3$ catalyst was found to be inactive for the preparation of polyethylene when tested under standardized conditions in a batch reactor. The employment of a hydrogen-activated 7% molybdena-silica gel catalyst produced only a trace of solid product from ethylene under the standardazed conditions employed in other batch runs. It would also appear that the alumina component of the catalyst is not effective merely because of its large surface area or pore volume. Activated aluminas usually have BET areas of the order of about 100 to 200 square meters per gram and function as desirable supports, while activated coconut charcoals have, typically, surface areas between about 750 and about 1000 square meters per gram or even more and do not function as desirable supports for molybdenum in the present process. The molybdenum compound component of active catalysts for ethylene polymerization is probably present in the catalysts in extremely finely-divided form, since X-ray diffraction analysis fails to reveal the presence of molybdenum compound.

In Table 1 are presented illustrative data obtained in the polymerization of ethylene in a flow reactor. The flow reactor was a vertical steel tube having an internal diameter of 1.1 inches and a volume of 450 ml., packed with a fixed bed of 4-6 mesh catalyst. The reaction tube contained a central well provided with three thermocouples, viz., one at the upper end, one at the middle, and one at the lower end of the well. One-fourth inch copper tubing was wound about the reaction tube and air or water was circulated therethrough for temperature control in the reaction tube. Two electrical resistance coils were wound over the copper coils to provide heat. The entire assembly was suitably lagged with insulating material. In the runs reported in Table 2, the partial pressure of ethylene was maintained at 900 p. s. i. g. For purposes of comparison, the run numbers employed herein are identical with the run numbers employed in my said copending application.

*Table 1*

| Run No. | Catalyst | Liquid | °C. Polym. Temp. | Pressure, p. s. i. g. | Space Velocity (g.feed/g.cat./hr.) | Resin, g. | $\eta sp \times 10^5$ | Grease, g. | Remarks |
|---|---|---|---|---|---|---|---|---|---|
| 54 | $Al_2O_3$ 7.5% $MoO_3$ | Benzene | 255 | 1,000 | 3.8 | 16<br>25<br>4 | 8,600 (a)<br>7,700 (b)<br>7,300 (c) | 8.9<br>0.0<br>4.0 | Time of cuts:<br>(a) after 1 hour.<br>(b) after 2¾ hours.<br>(c) after 3¾ hours. |
| 55 | $Al_2O_3$ 7.5% $MoO_3$ | Benzene | 150 | 800 | 1.6 | 0.7<br>33.0 | 9,600 (a)<br>45,500 (b) | 2.2<br>0 | (a) Polymer removed with liq. reaction (b) Polymer remaining on catalyst. Total reaction period was 1¼ hours. |

In Run 54 benzene was circulated downwardly over a hydrogen-activated molybdena-alumina catalyst at such a rate that the reactor was maintained three-fourths full. A partial ethylene pressure of 900 p. s. i. g. was maintained at the top of the reactor and substantially the only ethylene entering into contact with the catalyst was that in solution in the benzene. Solid polymer was produced and was collected in three fractions from the benzene reaction medium, as shown in Table 1. On opening the reactor upon completion of the run, the catalyst was found to be free of accumulated polymer with the exception of the first 2 inches of the catalyst bed, which may have been above the benzene level. The conversion of ethylene to solid polymer in this run was 36 weight percent. Substantially higher molecular weight ethylene polymers can be obtained by reducing the reaction temperature from 255° C. to a somewhat lower temperature of about 200° C. or 225° C.

In Run 55 the reaction temperature was reduced to 150° C., which was somewhat too low for continuous operation since an extremely high molecular weight polymer was formed which plugged the reactor.

In Table 2 are presented data obtained during the continuous polymerization of ethylene by downflow of ethylene and solvent through a hydrogen-activated commercial cobalt molybdate-alumina catalyst containing 3.28 weight percent CoO and 8.8 weight percent MoO₃ (before hydrogen activation) supported on an active alumina. The liquid hourly space velocity of the ethylene-solvent mixtures in the runs of Table 2 was 2 to 2.5.

only the rate of output was increased (compare Runs 57 and 58-A), but also the specific viscosity of the product was more than doubled. A possible disadvantage of using a high feed concentration is that the rapid rate of production of high molecular weight polyethylene causes the catalyst to fragment from ⅛-inch pellets to a fine powder. It has been found that the powder can simply be repelletted to produce an active catalyst. Between parts A and B of Run 58 hydrogen reactivation of the catalyst was effected at 850° F. and 300 p. s. i. g. hydrogen pressure, for about one-half hour. Run 58-A lasted 9 hours and 58-B about 7½ hours. In part B of Run 58, the temperature was raised to 270° C. As a result, the average specific viscosity fell sharply (38,100×10⁻⁵ in part A to 19,200×10⁻⁵ in part B). Catalyst reactivation by hydrogen was practiced following Run 58-B before the catalyst activity fell to the production rate of 2 grams of polymer per hour.

In Run 59, benzene was substituted for xylene as the reaction medium, with consequent substantial increase in the average rate of polymer production despite the relatively low polymerization pressure and ethylene concentration which were employed. Catalyst regeneration or reactivation by hydrogen intervened between parts A and C of Run 59. The relatively low molecular weight of the polymer obtained in Run 59-C is due to the relatively high operating temperature of 260° C. It is of interest to note that the hydrogen from the reactivation treatment of the catalyst was allowed to remain in the reactor while feed was introduced in Run 59-C.

*Table 2*

| Run | 56 | | 57 | 58 | | 59 | |
|---|---|---|---|---|---|---|---|
| | A | C | | A | B | A | C |
| Catalyst | CoMoO₄/Al₂O₃ | | | | | | |
| Temp., °C | 216 | 216 | 216 | 216 | 270 | 216 | 260 |
| Pressure, p. s. i. | 5,000 | 5,000 | 1,300 | 1,500 | 1,500 | 1,500 | 1,500 |
| Percent C₂H₄ in feed | 2 | 4 | 4 | 7 | 7 | 4 | 4 |
| Solvent | Xylene | Xylene | Xylene | Xylene | Xylene | Benzene | Benzene |
| Avg. ηsp×10⁵ | 19,000 | 24,700 | 17,800 | 38,100 | 19,200 | 19,000 | 11,000 |
| Max. polymer output, g./hr./200 g. cat | 2.4 | 8.3 | 7.3 | 7.9 | 4.5 | 9.2 | 16.1 |
| Hrs. to fall to 2 g./hr./200 g. cat | 8 | 9 | 12 | 10 | | 13 | 26 |
| Total grams polymer produced before rate fell to 2 g./hr. | | 35 | 32 | 60 | | 73 | 185 |
| Average rate of polymer production, g./hr. | 1.5 | 3.9 | 2.7 | 6 | 3.3 | 5.6 | 7.1 |

In Run 56-A, the catalyst activity at the end of 13 hours was 0.25 gram of polyethylene resin per hour per 200 grams of catalyst. At this point the ethylene feed was discontinued and the catalyst was extracted with hot xylene, but no reactivation could be obtained in this manner. The catalyst was then treated with hydrogen for 3 hours at 850° F. and 500 p. s. i. g., which markedly reactivated the catalyst, as indicated by the results of Run 56-C, which followed. The onstream period in Run 56-C was 22 hours. A comparison of Runs 56-C and 56-A indicates that the reactivation of the catalyst and the increase of ethylene concentration in the feed from 2 percent to 4 percent resulted in the production of a higher specific viscosity polymer at a substantially increased rate of production.

Since hydrogenation proved effective for catalyst regeneration, hydrogen was added with the charging stock during Run 57, but proved ineffective in prolonging the life of the catalyst. It was observed that a part of the ethylene was converted to ethane. Comparing Runs 57 and 56-C, it will be observed that reducing the reaction pressure reduced the average specific viscosity of the polymer product and also the average rate of polymer output.

To increase the rate of output of polyethylene, the concentration of the feed in Run 58 was raised from 4 to 7 percent. The data in Table 2 indicate that not Maximum initial conversion rates in the foregoing runs were between 90 and 95 percent and over half of the converted olefin was polymerized to solid polyethylene. The concentration of polyethylene in the reaction medium was therefore between about 1.0 and 4.0 percent.

A solution of 34% propylene and benzene was prepared and passed downwardly through a bed of molybdena-alumina catalyst which had been activated by hydrogen treatment at 463° C. and 150 p. s. i. g. hydrogen pressure for 1½ hours before use. It was found that propylene was converted to the extent of less than 1% in this operation to produce a polymer having a low molecular weight.

A 20% solution in benzene of a mixture of 68% ethylene and 32% isobutylene was contacted with cobalt molybdate-alumina catalyst at 154° C. and 1200 p. s. i. g. for a period of 107 minutes. Olefin conversion exceeded 95%. From the benzene solvent there were recovered 1.4 grams solid polymer ($\eta sp \times 10^5 = 41,600$) and 5.5 grams liquid polymer. In addition, 5 grams of solid polymer were extracted from the used catalyst. In a similar run, a 33% solution in benzene of a mixture of 50% each of ethylene and isobutylene was charged over cobalt molybdate-alumina catalyst to effect more than 95% olefin conversion. There were obtained 4.7 grams solid polymers ($\eta sp \times 10^5 = 34,800$) and 32.6 grams liquid polymer. In each case the solid polymers were very stiff but much more soluble in boiling xylene than polymers of similar specific viscosity derived from the polymerization of ethylene alone.

Table 3 is devoted to data obtained on flow polymerization of ethylene in solution in the indicated aromatic hydrocarbon solvents in contact with an 8% MoO₃-gamma alumina catalyst. Run 61 was carried out in nine run periods as a life test, with hydrogen reactivation of the catalyst between periods, except after periods C and E. In general, it will be noted that the activated MoO₃-Al₂O₃ catalyst was far less sensitive to variations in the concentration of ethylene in the solvent medium than the cobalt molybdate-alumina catalysts. The yields of solid polyethylenes were good and specific viscosities were good at reaction temperatures not in excess of about 250° C.

In Run 61, after each period of operation, except as otherwise indicated, the catalyst was leached of accumulated polymer by circulating the solvent medium therethrough and was then reconditioned by hydrogen treatment. Pelleted catalyst of 6-14 mesh was employed. When the catalyst was removed from the reactor at the end of the life test, there was no evidence of catalyst disintegration. Approximately one gram of solid polyethylene was produced per gram of catalyst during the life test and the polyethylenes were tough and flexible.

"greases." The polyethylenes may be employed as coating materials, binders, etc. to even a wider extent than polyethylenes made by prior processes.

The polymers produced by the process of the present invention, especially the polymers having high specific viscosities in excess of about $100,000 \times 10^{-5}$, can be blended with the conventional lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having specific viscosities of $50,000 \times 10^{-5}$ or more produced by the present invention, can be employed in small proportions to substantially increase the viscosity of fluent liquid hydrocarbon oils and as gelling

*Table 3.—Ethylene polymerization-flow reactor*

| Run No. | 60 | 61A | 61B | 61C | 61D | 61E | 61F |
|---|---|---|---|---|---|---|---|
| Catalyst | sAl₂O₃—8% MoO₃ | | | | | | |
| Activation with H₂: | | | | | | | |
| Temp., °C | 450 | 450 | 450 | 450 | None | 450 | None. |
| Time, min | 5 | 5 | 5 | 5 | do | 5 | Do. |
| Solvent | Benzene | Benzene | Benzene | Benzene | Benzene | Benzene | Benzene. |
| Ethylene conc. in Solvent, percent by wt | 11.3 | 15.2 | 11.5 | 20.0 | 20.0 | 15.5 | 17.5 |
| Temperature, °C | 230 | 243 | 250 | 243 | 238 | 238 | 236. |
| Pressure, p. s. i. | 1,000 | 1,200 | 1,200 | 1,200 | 1,200 | 1,200 | 1,200. |
| Space velocity V./V./hr | 2.5 | 2.6 | 3.0 | 2.7 | 2.6 | 2.2 | 2.3. |
| Duration of run, min | 62 | 69 | 121 | 95 | 54 | 143 | 70. |
| Ethylene conv. (olefins), percent | 65 | 78 | 54 | 62 | 23 | 82 | 39. |
| Total products, g | 28 | 41 | 58 | 30 | 10 | 50 | 7. |
| Product distribution, percent: | | | | | | | |
| Alkylate | }46 | 58 | 48 | 37 | 59 | 42 | 56. |
| Polyalkylate and polymer | | | | | | | |
| Solid Polyethylenes | 54 | 42 | 52 | 63 | 41 | 58 | 44. |
| Avg. Conc. of Polyethylenes in Solvent (Calc.), percent by weight | 4.0 | 5.0 | 3.2 | 7.8 | 1.9 | 7.3 | 3.0. |
| $\eta sp \times 10^5$ (Solid Polyethylenes) | 22,200 | 21,900 | 17,900 | 22,100 | 39,000 | 19,200 | |

| Run No. | 61G | 61H | 61I | 62 | 63 | 64 | 65 |
|---|---|---|---|---|---|---|---|
| Catalyst | sAl₂O₃—8% MoO₃ | | | | | | |
| Activation with H₂: | | | | | | | |
| Temp., °C | 450 | 450 | 450 | 450 | 450 | 450 | 450. |
| Time, min | 5 | 5 | 5 | 15 | 15 | 15 | 15. |
| Solvent | Benzene | Benzene | Benzene | Xylene | Xylene | Xylene | Xylene. |
| Ethylene conc. in Solvent, percent by wt | 17.5 | 13.0 | 3.9 | 15.0 | 15.0 | 4.0 | 9.3 |
| Temperature, °C | 266 | 252 | 240 | 230 | 230 | 230 | 230. |
| Pressure, p. s. i. | 1,200 | 1,200 | 1,200 | 1,000 | 1,000 | 1,000 | 500. |
| Space velocity V./V./hr | 1.9 | 2.3 | 2.5 | 1.3 | 4.7 | 4.9 | 4.9. |
| Duration of run, min | 93 | 164 | 143 | 281 | 86 | 106 | 93. |
| Ethylene conv. (olefins), percent | 84 | 48 | 56 | 72 | 43 | 42 | 30. |
| Total products, g | 37 | 37 | 45 | 70 | 36 | 23 | 31. |
| Product distribution, percent: | | | | | | | |
| Alkylate | 41 | 21 | 57 | 15 | 13 | 21 | 11. |
| Polyalkylate and polymer | 32 | 26 | 14 | 15 | 11 | 26 | 6. |
| Solid Polyethylenes | 27 | 53 | 29 | 70 | 76 | 53 | 83. |
| Avg. Conc. of Polyethylenes in Solvent (Calc.), percent by weight | 4.0 | 3.3 | 0.6 | 7.5 | 4.9 | 0.9 | 2.3. |
| $\eta sp \times 10^5$ (Solid Polyethylenes) | 8,300 | 8,900 | 18,500 | 21,900 | 18,000 | 18,000 | 17,000. |

The polymers produced by the process of this invention can be subjected to such after-treatment as may be desired, to fit them for particular uses or to impart desired properties. Thus, the polymers having specific viscosities between about $8,000 \times 10^{-5}$ and $40,000 \times 10^{-5}$ and forming commercial-type resins, can be extruded, mechanically milled, filmed or cast or converted to sponges or latices. Antioxidants, stabilizers, fillers, extenders, plasticizers, pigments, insecticides, fungicides, etc. can be incorporated in the polyethylenes or in by-product alkylates or agents for such oils. The solution of about 1 gram of an ethylene polymer produced by this invention, having a specific viscosity $\times 10^5$ of about 50,000 in about ten liters of xylenes at a temperature close to the boiling point produced an extremely viscous solution.

The polymers produced by the present process can be subjected to chemical modifying treatments, such as halogenation, halogenation followed by dehalogenation, sulfonation, and other reactions to which hydrocarbons may be subjected.

Having thus described my invention, I claim:

1. In a process of producing high-molecular-weight hydrocarbons from a gaseous olefin selected from the group consisting of ethylene, propylene and mixtures thereof, which process comprises bringing such gaseous olefin into contact with a liquid hydrocarbon reaction medium, contacting said olefin and said medium with a solid activated catalyst which, before activation, comprises essentially a hexavalent molybdenum oxygen compound combined with a supporting material selected from the group consisting of alumina, titania and zirconia, which catalyst has been activated before use in polymerization by partially reducing said hexavalent molybdenum oxygen compound when present on said supporting material by heating to a temperature between about 400° and 650° C. in the presence of a reducing gas, effecting said contacting in a reaction zone at a temperature between about 75° and 325° C. under a superatmospheric pressure and converting gaseous olefin to polymer, and removing reaction mixture comprising liquid medium, solid catalyst, polymer, and unreacted olefin from the reaction zone, the improved method of operation which comprises separating solid catalyst from at least a portion of the reaction mixture while maintaining the said portion at a temperature between about 75° and 325° C. and under a pressure substantially equivalent to the employed polymerization pressure, flowing separated reaction mixture substantially free of solid catalyst into a zone of reduced pressure, thereafter cooling separated reaction mixture to a temperature between about 0° and 40° C., and separating high molecular weight hydrocarbons deposited by the liquid reaction mixture upon said cooling and pressure reduction.

2. The process of claim 1 in which the selected gaseous olefin is ethylene.

3. The process of claim 1 wherein said material is alumina.

4. In a process of producing high molecular weight olefin polymers from a gaseous olefin selected from the group consisting of ethylene, propylene, and mixtures thereof, which process comprises introducing a gas containing a selected olefin and a liquid hydrocarbon reaction medium into contact with a solid activated catalyst which, before activation, comprises essentially a hexavalent molybdenum oxygen compound combined with a supporting material selected from the group consisting of alumina, titania and zirconia, which catalyst has been activated before use in polymerization by partially reducing said hexavalent molybdenum oxygen compound when present on said supporting material by heating to a temperature between about 400° and 650° C. in the presence of a reducing gas, maintaining liquid reaction medium, absorbed olefin, and molybdena catalyst in a reaction zone at a temperature between 130° to 260° C. under a pressure of atmospheric to 5,000 pounds per square inch gauge for a time sufficient to convert a substantial portion of the olefin to polymer, and removing a reaction mixture comprising a liquid medium, solid catalyst, unreacted olefin, and polymer from the reaction zone, the improved method of operation which comprises settling out a dense slurry of solid catalyst from the reaction mixture at reaction temperature and pressure, recycling settled slurry to the reaction zone, flowing liquid reaction mixture from the settling step to a filtering zone, filtering solid catalyst particles from reaction mixture at a temperature between about 75° and 325° C. and under a pressure substantially equivalent to the employed polymerization pressure, flowing filtrate therefrom into a zone of reduced pressure, cooling the filtrate to a temperature between about 0° and 40° C., and recovering high-molecular-weight olefin polymer from the reaction mixture from which the said polymer is separated by the said cooling and pressure reduction.

5. In a process of producing normally solid olefin polymer from a gaseous olefin selected from the group consisting of ethylene, propylene, and mixtures thereof, which process comprises incorporating a selected gaseous olefin in a hydrocarbon reaction medium selected from the group consisting of benzene, toluene, the xylenes, tetralin and decalin, introducing the said medium containing absorbed olefin into contact with a solid activated catalyst which, before activation, comprises essentially molybdenum trioxide combined with a supporting material selected from the group consisting of alumina, titania and zirconia, which catalyst has been activated before use in polymerization by partially reducing said molybdenum trioxide when present on said supporting material by heating to a temperature between about 400° and 650° C. in the presence of a reducing gas, effecting said contact under a pressure between about 200 and 5,000 pounds per square inch gauge and at a temperature between about 130° and 260° C. and maintaining said contact for a time sufficient to convert at least a substantial portion of the olefin to polymer and provide a concentration of the so-formed polymer in the reaction medium of between about 0.2 and 10.0 percent by weight based on the weight of the said medium, and removing reaction mixture comprising liquid medium, solid catalyst, unreacted olefin and polymer, from the reaction zone, the improved method of operation which comprises separating solid catalyst from reaction mixture at a temperature between about 130° and 260° C. and under a pressure substantially equivalent to the employed polymerization pressure, flowing separated reaction mixture substantially free of solid catalyst into a zone of reduced pressure, cooling the reaction product to a temperature between 0° and 40° C., and recovering olefin polymers that have separated from the cooled reaction mixture.

6. In a process of producing normally solid olefin polymer from a gaseous olefin selected from the group consisting of ethylene, propylene, and mixtures thereof, which process comprises incorporating a selected gaseous olefin in a hydrocarbon reaction medium selected from the group consisting of benzene, toluene, the xylenes, tetralin, and decalin, introducing the said medium containing absorbed olefin into contact with a solid activated catalyst which, before activation, comprises essentially a hexavalent molybdenum oxygen compound combined with a supporting material selected from the group consisting of alumina, titania and zirconia, which catalyst has been activated before use in polymerization by partially reducing said hexavalent molybdenum oxygen compound when present on said supporting material by heating to a temperature between about 400° and 650° C. in the presence of a reducing gas, effecting said contact under a pressure between about 200 and 5,000 pounds per square inch gauge and at a temperature between about 130° and 260° C. and maintaining said contact for a time sufficient to convert at least a substantial portion of the olefin to polymer and provide a concentration of the so-formed polymer in the reaction medium of between about 0.5 and 5.0 percent by weight based on the weight of the said medium, and removing reaction mixture comprising liquid medium, solid catalyst, unreacted olefin and polymer, from the reaction zone, the improved method of operation which comprises settling out the dense slurry of solid catalyst from the reaction mixture at reaction temperature and pressure, recycling settled slurry to the reaction zone, withdrawing a portion of the settled catalyst slurry from the recycle, regenerating catalyst contained in the said withdrawn slurry, recycling regenerated catalyst to the reaction zone, flowing liquid reaction mixture from the aforesaid catalyst settling step to a filtering zone, filtering solid catalyst particles from reaction mixture at a temperature between about 75° and 325° C. and under a pressure substantially equivalent to the employed polymerization pressure, flowing filtrate therefrom into a zone of reduced pressure, cooling the filtrate to a temperature between about 0° and 40° C., and recovering high-molecular-weight olefin polymer from the reaction mixture from which the said polymer is separated by the said cooling and pressure reduction.

7. The process of claim 6 wherein the said withdrawn portion of settled catalyst slurry is washed to remove high molecular weight polymer with an aromatic hydrocarbon, and is subsequently treated with hydrogen at a pressure between about atmospheric and about 1000 pounds per square inch gauge and at a temperature between about 400° and 650° C.

References Cited in the file of this patent

UNITED STATES PATENTS 2,396,791  Krase et al. _____ Mar. 19, 1946